United States Patent [19]

Fukui et al.

[11] Patent Number: 5,532,309
[45] Date of Patent: Jul. 2, 1996

[54] RESIN COMPOSITION FOR AUTOMOBILE BUMPER

[75] Inventors: Osamu Fukui, Kamakura; Kouhei Ueno, Tokyo; Yoshifumi Nakano, Kisiwada; Yukimasa Hamada, Sakai; Takeyoshi Nishio, Okazaki; Takao Nomura; Nobuya Kawamura, both of Toyota, all of Japan

[73] Assignees: Ube Industries, Ltd., Ube; Toyota Jidosha Kabushiki Kaisha, Toyota, both of Japan

[21] Appl. No.: 262,365

[22] Filed: Jun. 20, 1994

Related U.S. Application Data

[63] Continuation of Ser. No. 858,139, Mar. 27, 1992, abandoned.

[30] Foreign Application Priority Data

Mar. 28, 1991 [JP] Japan .................................. 3-089854

[51] Int. Cl.⁶ .......................... C08K 3/34; C08L 23/00; C08L 53/02
[52] U.S. Cl. ....................... 524/451; 524/505; 525/88; 525/95; 525/240
[58] Field of Search ................... 524/451, 505; 525/95, 88, 240

[56] References Cited

U.S. PATENT DOCUMENTS

| | | | |
|---|---|---|---|
| 4,621,114 | 11/1986 | Watanabe | 524/451 |
| 4,707,514 | 11/1987 | Katsuki et al. | 524/474 |
| 4,734,450 | 3/1988 | Kawai et al. | 524/451 |
| 4,814,019 | 3/1989 | Weber | 524/451 |
| 5,034,525 | 8/1991 | Tamashime et al. | 524/451 |
| 5,045,589 | 9/1991 | Ueno | 525/89 |

FOREIGN PATENT DOCUMENTS

| | | | |
|---|---|---|---|
| 55-21494 | 2/1980 | Japan . | |
| 57-55952 | 4/1982 | Japan . | |
| 57-159841 | 10/1982 | Japan . | |
| 57-177038 | 10/1982 | Japan . | |
| 57-195134 | 11/1982 | Japan . | |
| 57-207630 | 12/1982 | Japan . | |
| 58-17139 | 2/1983 | Japan . | |
| 58-111846 | 7/1983 | Japan . | |
| 59-98157 | 6/1984 | Japan . | |
| 1043650 | 3/1986 | Japan | 524/451 |
| 2199146 | 8/1990 | Japan | 524/451 |
| 2210050 | 6/1989 | United Kingdom | 524/451 |

*Primary Examiner*—Paul R. Michl
*Assistant Examiner*—Olga Asinovsky
*Attorney, Agent, or Firm*—Finnegan, Henderson, Farabow, Garrett & Dunner

[57] ABSTRACT

A resin composition for an automobile bumper comprising components (A), (B), and (C) described below:

(A) 45 to 74% by weight of a crystalline ethylene-propylene block copolymer having (a) a flexural modulus of 15,000 kg/cm² or more, (b) an ethylene content of 5 to 20% by weight, (c) an intrinsic viscosity (decalin, 135° C.) of a portion soluble in p-xylene at room temperature of 3 or more, (d) a melt flow index (MI) of 21 to 70 g/10 min., and (e) a content of a portion insoluble in boiling n-heptane of 97% by weight or more;

(B) 21 to 35% by weight of elastomer selected from the group consisting of components (I), (II) and (III) and having a weight ratio of (I) : [(I)+(II)+(III)] of from 0.5 to 1.0, (a) said component (1) being an amorphous ethylene-butene copolymer having a butene content of 10 to 25% by weight and a Mooney viscosity value, $(ML_{1+4}, 100°\ C.)$ of 5 to 20, (b) said component (II) being an amorphous ethylene-propylene copolymer having an ethylene content of 70 to 90% by weight and a Mooney viscosity value $(ML_{1+4}, 100°\ C.)$ of 5 to 40, and (c) said component (III) being a hydrogenated block copolymer consisting of 10 to 40% by weight of an aromatic vinyl polymer block X and 60 to 90% by weight of a conjugate diene polymer block Y, having a structure of said block components being X–Y or $X–(Y–X)_n$, wherein n is 1 or 2, 90 mol% or more of said block Y being hydrogenated and the melt flow index (MI) of the hydrogenated block copolymer being 5 g/10 min. (230° C., 2.16 kg) or more, and;

(C) 5 to 10% by weight of talc having a combustion loss of 7% by weight or less, containing no particles having a diameter of 10 μm or more and having an average particle diameter $D_{50}$ of 1.0 to 3.0 μm.

7 Claims, No Drawings

5,532,309

RESIN COMPOSITION FOR AUTOMOBILE BUMPER

This application is a continuation of application Ser. No. 07/858,139 filed Mar. 27, 1992, now abandoned.

BACKGROUND OF THE INVENTION

1. Field of the Invention

The present invention relates to a polypropylene resin composition for an automobile bumper, having a high melt flow index (MI) value, i.e., 15 g/min. or more and relates to an automobile bumper having a surface hardness of 55 (Rockwell R) or more and an excellent coating property, i.e., a paint coated thereon is not easily scratched off.

2. Description of the Related Art

Recently, a polypropylene resin composition has been often used for an automobile bumper, because it is rust-free, much lighter than steel and flexible in design. Various polypropylene resin compositions for automobile bumpers are shown in, for example, Japanese Unexamined Patent Publication (Kokai) Nos. 57-55,952, 58-111,846, 59-98,157, 58-17,139, 57-177,038, 57-207,630, 57-195,134, 57-159, 841, and 55-22,494.

Although automobile bumpers made of resin compositions proposed in the above-mentioned patent publications are superior in impact strength, the surfaces of the bumpers are so soft that they are easily scratched. In addition, the fluidity of the resin composition is so deficient that there is much difficulty in the application thereof to the injection molding of automobile bumpers, which has been growing in size in recent years.

SUMMARY OF THE INVENTION

Accordingly, it is an object of the present invention to provide a resin composition eliminating the above-mentioned problem.

It is another object to provide a resin composition which is suitable for injection molding of a large automobile part such as an automobile bumper and which provides a scratch-proof automobile bumper to which applied paint cannot be easily scratched off.

Other objects and advantageous of the present invention will be apparent from the following description.

In accordance with the present invention, there is provided a resin composition for an automobile bumper comprising components (A), (B) and (C) described below.

(A) 45 to 75% by weight of a crystalline ethylene-propylene block copolymer having (a) a flexural modulus of 15,000 kg/cm$^2$ or more, (b) an ethylene content of 5 to 20% by weight, (c) an intrinsic viscosity (decalin, 135° C.) of a portion which is soluble in p-xylene at room temperature of 3 or more, (d) a melt flow index (MI) of 21 to 70 g/10 min, and (e) a content of a portion which is insoluble in boiling n-heptane of 97% by weight or more;

(B) 21 to 35% by weight of elastomer selected from the group consisting of component (I), (II) and (III) and having a weight ratio of (I):[(I)+ (II)+(III)] in the range of from 0.5 to 1.0, (a) said component (1) being an amorphous ethylene-butene copolymer having a butene content of 10 to 25% by weight and a Mooney viscosity value (ML$_{1+4}$ at 100° C.) of 5 to 20, (b) said component (II) being an amorphous ethylene-propylene copolymer having an ethylene content of 70 to 90% by weight and a Mooney viscosity value (ML$_{1+4}$ at 100° C.) of 5 to 40, and (c) said component (III) being a hydrogenated block copolymer consisting of 10 to 40% by weight of an aromatic vinyl polymer block X and 60 to 90% by weight of a conjugate diene polymer block Y, having a structure of X–Y or X–(Y–X)$_n$, wherein n is 1 or 2, 90 mol% or more of said block component Y being hydrogenated and the melt flow index (MI) the hydrogenated block copolymer being 5 g/10 min. (230° C., 2.16 kg) or more, and;

(C) 5 to 10% by weight of talc having a combustion loss of 7% by weight or less, containing no particles having a diameter of 10 μm or more and having an average particle diameter D$_{50}$ of 1.0 to 3.0 μm.

DESCRIPTION OF THE PREFERRED EMBODIMENTS

Now, the present invention will be described more specifically below.

First, the component (A) will be described. The crystalline ethylene-propylene block copolymer as the component (A) of the present invention has an ethylene content of 5 to 20% by weight, preferably 6 to 15% by weight. When the ethylene content is not within the range mentioned above, the disadvantage arises that the melt flow index of the resin composition becomes less than 15 and the value of the surface hardness of the article molded from the resin composition becomes less than 55.

The flexural modulus of the component (A) should be 15,000 kg/cm$^2$ or more, preferably 17,000 kg/cm$^3$ or more, more preferably 17,000 to 20,000 kg/cm$^2$. When the flexural modulus is less than 15,000 kg/cm$^2$, an article molded from the resin composition of the present invention is deficient in the surface hardness, indicating that the resin composition is not ideal for an automobile bumper. The intrinsic viscosity (decalin, 135° C.) of a portion soluble in p-xylene at room temperature, i.e. the constituent formed of an amorphous ethylene-propylene copolymer and low molecular polymer, is 3 or more, preferably 4 or more, and more preferably 4.0 to 4.4. When the intrinsic viscosity is less than 3, the Izod impact strength at −30° C. of an article molded from the resin composition is unduly low.

The melt flow index (MI) of the component (A) is 21 to 70, and preferably 25 to 50. When the MI is less than 21, the molded article is deficient in appearance. Conversely, when the MI is more than 70, the molded article is deficient in the impact strength.

Further, the content of a portion of the component (A) insoluble in boiling n-heptane is 97% by weight or more, preferably 97.5% by weight or more, and more preferably 98% by weight or more. The portion insoluble in boiling n-heptane mainly refers to a crystalline isotactic polypropylene (which may be occasionally called "matrix"). When the content of the insoluble portion is less than 97% by weight, an article molded from the resin composition of the present invention is deficient in surface hardness. Such a resin composition is unsuitable for use in an automobile bumper.

The crystalline ethylene-propylene block copolymer as the component (A) of the present invention can generally be produced by the methods known in the art. A commercially available product that fulfils the above-mentioned conditions may be used instead.

Alternatively, a crystalline ethylene-propylene block copolymer that has been graft modified with an unsaturated organic acid or a derivative of an unsaturated organic acid may be used as the component (A) of the present invention so long as the characteristic properties of the present resin composition and the shaped article obtained by molding the resin composition do not deviate from the specific conditions.

The resin composition of the present invention is such that it will contain the component (A) in a proportion of 45 to 74% by weight, preferably 55 to 69% by weight, based on the whole composition. When the content of the component (A) is less than 45% by weight, the resin composition is deficient in moldability. When this content is more than 74% by weight, a paint coated on an article produced by molding the resin composition is easily scratched off.

The component (A) may comprise two or more species of crystalline ethylene-propylene block copolymers invariably satisfying the specific requirements mentioned above and totalling a content that falls in the range mentioned above.

Then, the component (B) of the present invention will be described below.

The component (B) of the present invention is an elastomer containing the following component (I). This elastomer further comprises the following component (II) and/or (III) in a specific ratio.

The component (B) (I) of the present invention is an amorphous ethylene-butene copolymer having a butene content of 10 to 25% by weight preferably 12 to 22% by weight, and a value of Mooney viscosity, $ML_{1+4}$ (100° C.), of 5 to 20, preferably 10 to 15. When the butene content is less than 10% by weight, the ethylene chain of the copolymer is unduly high and an article molded from the resin composition is deficient in the impact resistance. When the butene content is more than 25% by weight, the resin composition is unduly soft and the molded article is deficient in the surface hardness. When the Mooney viscosity value is less than 5, the molecular weight of the copolymer is unduly small and the molded article is deficient in the impact resistance. When the Mooney viscosity value is more than 20, the molecular weight of the copolymer is unduly large so that the copolymer is not thoroughly dispersed in the above-mentioned component (A), i.e. the crystalline ethylene-propylene block copolymer, and such resin composition is not suitable for molding a large article such as an automobile bumper. The molded article of the resin composition is deficient in the impact resistance.

The amorphous ethylene-butene copolymer as the component (B) (I) of the present invention can be produced generally by the known methods. A commercially available product that fulfils the conditions mentioned above may be used.

The component (B) (II) of the present invention is an amorphous ethylene-propylene copolymer that has an ethylene content of 70 to 90% by weight, preferably 75% to 85% by weight, and a Mooney viscosity value $ML_{1+4}$ (100° C.) of 5 to 40, preferably 10 to 30. When the ethylene content is less than 70% by weight, the article molded from the resin composition is deficient in the surface hardness. When the ethylene content is more than 90% by weight, the ethylene chain of the copolymer is so long that the molded article is deficient in the impact resistance. When the Mooney viscosity value is less than 5, the molecular weight of the copolymer is so small that the molded article of the resin composition is deficient in the impact resistance. When the Mooney viscosity value is more than 40, the molecular weight of the copolymer is so large that the copolymer is not thoroughly dispersed in the component (A), i.e. the crystalline ethylene propylene block copolymer and the molded article of the resin composition is deficient in the impact resistance.

The amorphous ethylene-propylene copolymer as the component (B) (II) of the present invention can be produced generally by the known methods. A commercially available amorphous ethylene-propylene copolymer that fulfils the conditions mentioned above may be used.

The component (B) (III) of the present invention is a hydrogenated rubber obtained from the hydrogenation of a block copolymer consisting of 10 to 40% by weight, preferably 10 to 30% by weight, of an aromatic vinyl compound polymer block component and 60 to 90% by weight, preferably 70 to 90% by weight, of a conjugate diene polymer block Y, having a structure of X–Y or X–(Y–X)$_n$, wherein n is for a numerical value of 1 to 2, 90 mol% or more, preferably 97 to 100 mol%, of the block Y being hydrogenated. The component (B) (III) has a melt flow index (MI) value of 5 g/10 min. (230° C., 2.16 kg) or more, preferably 6 to 10 g/10 min.

Examples of the aromatic vinyl compound polymer block of the block component X mentioned above are styrene based polymers such as polystyrene, poly-α-methyl styrene, poly-p-methyl styrene, and polychlorostyrene. Among the above styrene based polymers, polystyrene and poly-α-methyl styrene have proven to be particularly effective. Examples of the conjugate diene based polymer block of the block component Y mentioned above are polybutadiene, polyisoprene, and polychloroprene. Among the above conjugate diene based polymer blocks, polybutadiene and polyisoprene have proven to be particularly effective.

The component (B) (III), i.e. the block copolymer of the present invention is a block copolymer having the block X and the block Y and having a structure of X–Y or X–(Y–X)$_n$ wherein n stands for a numerical value of 1 to 2. This block copolymer contains the block X in a proportion in the range of 10 to 40% by weight, preferably 10 to 30% by weight. If, in this case, the portion of the block X in the block copolymer is less than 10% by weight, the article molded from the resin composition is deficient in rigidity. When the portion of X is more than 40% by weight, the molded article is deficient in the impact resistance.

The component (B) (III) of the present invention is a hydrogenated rubber obtained by hydrogenating the block copolymer mentioned above. The hydrogenation is effected by 90 mol% or more, preferably not less than 97 mol% or more, of the block Y of the block copolymer. When less than 90 mol% of the block Y, is hydrogenated, the molded article of the resin composition is not weather-proof.

The MI value of the hydrogenated rubber of the present component (III) is 5 g/10 min. (230° C., 2.16 kg) or more, preferably 6 g/10 min. (230° C., 2.16 kg) or more, and more preferably 6 to 17 g/10 min. When the MI is less than 5 g/10 min., the hydrogenated rubber cannot be dispersed well in the crystalline ethylene-propylene block copolymer and the molded article of the resin composition is deficient in the impact strength.

Specifically, as the component (B) (III) of the present invention, a proprietary product of Shell Chemical K.K. marketed under the trademark designation "Clayton" and a proprietary product of Kuraray Co., Ltd. marketed under the trademark designation "Septon" can be used. These rubbers are commercially available. The component (III) may comprise two or more species of hydrogenated rubbers as long as the requirements mentioned above are fulfilled.

The component (B), i.e. the elastomer of the present invention consists of the components (I), (II) and (III) in a weight ratio of (I):(I)+(II)+(III) in the range of 0.5 to 1.0, preferably 0.6 to 1.0. When the weight ratio is less than 0.5, the surface rigidity of the shaped article is not sufficient for use as an automobile bumper.

The resin composition of the present invention contains the elastomer of the component (B) in a proportion in the range of 21 to 35% by weight, preferably 23 to 30% by weight. When the content of the component (B) is less than 21% by weight, the molded article of the resin composition is deficient in the impact resistance and the paint coated on the article is easily scratched off. Conversely, when this content is more than 30% by weight, the molded article is deficient in the surface rigidity.

Next, the third component (C) of the present invention will be described below.

The talc of the component (C) has a combustion loss of 7% by weight or less, preferably 5.5% by weight or less, contains no particles exceeding 10 μm in diameter, and has an average particle diameter, $D_{50}$, of 1.0 to 3.0 μm, preferably 1.0 to 2.5 μm.

When the talc contains particles exceeding 10 μm, the shaped article of the resin is deficient in the impact resistance. Conversely, when the average particle diameter, $D_{50}$, of the talc is less than 1.0 μm, the talc is not dispersed well in the resin composition and the molded article of the resin composition is deficient in the impact strength. Conversely, when the average particle diameter is more than 3.0 μm, although the dispersion is obtained satisfactorily, the molded article of the resin composition is deficient in the impact strength. In this case, the particle size distribution of the talc is determined by a natural centrifugal sedimentation type automatic particle size distribution tester produced by Horiba Seisakusho K.K. and marketed under the product code "CAPA-300".

When the combustion loss of the talc is more than 7% by weight, the molded article of the resin composition is deficient in the impact strength and is deficient in rigidity. The resin composition containing such talc is not suitable for an automobile bumper.

The surface of the talc in the present invention can be chemically or physically treated as long as the surface treatment induces no deviation of particle diameter, particle size distribution or combustion loss from the range specified above and does not cause impairing of physical or chemical properties of the resin composition according to the present invention. The agents effectively used for the purpose of this surface treatment are a silane coupling agent, a higher fatty acid, a fatty acid metal salt, an unsaturated organic acid or its derivative, an organic titanate, a fatty acid, and a polyethylene glycol ether, or others.

In the present invention, the talc is contained in the resin composition in a proportion of 5 to 20% by weight, preferably 8 to 18% by weight. When the talc content is less than 5% by weight, the shaped article of the resin composition is deficient in the flexural modulus. When this content is more than 20% by weight, the shaped article is deficient in the impact strength.

The resin composition of the present invention can be produced by mixing the above-mentioned components (A), (B), and (C) in amounts calculated to account for respective contents falling in the specific ranges. The mixing of the components can be carried out by a varying mixer selected from, for example, a Banbury mixer, a single-axis extruder, a double-axis extruder, and a high-speed double-axis extruder, and desirably, the mixing can be effected easily by melting and mixing the components by a Banbury mixer or a high-speed double-axis extruder. As regards the sequence of the mixing of the components, when the resin composition is produced by first melting and mixing the crystalline ethylene-propylene block copolymer as the component (A) and the talc as the component (C) and then melting and mixing elastomer as the component (B) are melted and mixed by the same mixing device as mentioned above, it gives a molded article having a particularly high impact strength. An antioxidant, an ultraviolet absorbent, a pigment, a coating property improver, and a lubricant may be incorporated in the present resin composition during or after the mixing of the components. The antioxidants effectively usable herein include, for example, 2,6-ditertiary butyl phenol, 2,6-ditertiary butyl-4-ethyl phenol, 2,6-ditertiary butyl-4-butyl phenol, 2,6- ditertiary butyl-α-dimethylamino-para-cresol, 6-(4- hydroxy-3,5-ditertiary butylanilino)-2,4-bisoctylthio- 1,3,5-triazine, n-octadecyl-3-(4'-hydroxy-3',5'-ditertiary butyl phenyl)propionate, 2,6-ditertiary butyl-4-methylphenol (BHT), tris(2-methyl-4-hydroxy-5-tertiary butyl phenyl)butane, tetrakis-[methylene-3-(3',5'-ditertiary butyl-4-hydroxyphenyl)-propionate]methane, 1,3,5- trimethyl-2,4,6-tris(3,5-ditertiary butyl-4- hydroxybenzyl)benzene, and dilauryl thiodipropionate.

The ultraviolet absorbents effectively usable herein include, for example, 2-hydroxy-4-n-octoxy benzophenone, 2-hydroxy-4-octadesiloxy benzo-phenone, 4-dodexiloxy-2-hydroxy benzene phenone, 2-(2'-hydroxy-3-tertiary butyl-5'-methyl phenyl)-5-chlorobenzotriazole, 2-(2'-hydroxy-3',5'-ditertiary butyl phenyl)-5-chlorobenzotriazole, and bis-(2,6-dimethyl-4-piperizyl)sebacate. Iron black, carbon black, titanium dioxide, etc. may be cited as examples of the pigment. Magnesium benzoate may be cited as an example of the coating property improver. Metal salts of fatty acids, fatty acid amides, etc. may be cited as examples of the lubricants.

The resin composition of the present invention obtained by mixing the above-mentioned components has a MI of 15 g/10 min. (230° C., 2.16 kg) or more and the molded article of this resin composition has a surface hardness of 55 (Rockwell, R scale) or more, preferably 55 to 70. By molding the resin composition of the present invention by the conventional injection molding technique, there can be obtained a molded article that is highly scratchproof and exhibits high rigidity and surface hardness. A paints coated on the article is not easily scratched off. Thus, the resin composition of the present invention can be ideally used in the production of an automobile bumper.

When the MI of the resin composition of the present invention is less than 15 g/10 min., this resin composition is deficient in the flowability and is not easily injection molded. When the surface hardness of the molded article of the present resin composition is less than 55, the molded article is susceptible to damage. Thus, the resin composition is not suitable for an automobile bumper.

In the present invention, the physical properties of the components, the resin composition, and the molded article of the resin composition are determined by the following methods.

(1) Melt flow index (MI):

According to an ASTM D1238 method (230° C. under a load of 2.16 kg).

(2) Flexural modulus:

According to an ASTM D790 method (23° C.).

(3) Izod impact strength:

According to an ASTM D256 method (−30° C.).

(4) Surface hardness:

According to an ASTM D785 method (Rockwell R scale).

(5) Coating property:

A given composition was molded into flat-sheet test pieces of 50×90×2 (mm) by an injection molding machine. The surfaces of the test pieces were cleaned by 30 seconds exposure to saturated vapor of 1,1,1-trichloroethane. Then, the test pieces were dried for 10 minutes in an oven set at an internal temperature of 90° C. Then, the cleaned and dried test pieces were subjected to a plasma treatment under the vacuum condition of 1.0 Torr, 0.05 kw of microwave output, 0.3 seconds of treating time, air as a treating gas, and 600 cc/min. of gas flow volume.

After the plasma treatment, the test pieces were coated with a one-component type urethane-based overcoating material to a thickness of 40 μm, dried at 120° C. for 30 minutes, and then allowed to stand at room temperature for 48 hours to obtain coated test pieces.

The coat on each test piece was incised with perpendicular intersecting regularly spaced linear incisions defining a total of 100 small squares of 1 mm. An adhesive tape was applied to the coated test piece containing the intersecting cuts. Then, the adhesive tape was peeled off the coated test piece and a count was taken of the small squares from which the coat was removed together with the adhesive tape. The coating property of the resin composition was rated on a three-point scale, wherein o stands for a test piece producing absolutely no removed square, Δ for a test piece producing 1 to 10 removed squares, and x for test pieces producing 11 or more removed squares.

Examples

The present invention will now be explained in detail by referring to Examples, but these Examples do not in any way limit the present invention.

The crystalline ethylene-propylene block copolymer A-1, A-2, and A-3 employed as the component (A) in the Examples and Comparative Examples had ethylene contents of 7.3, 7.1, and 7.5% by weight, boiling n-heptane insoluble contents of 97.6, 97.7, and 93.4% by weight, an intrinsic viscosities (decalin, 135° C) of the soluble matter at room temperature in p-xylene of 4.3, 4.0, and 4.2, MI's of 30, 42, and 31 g/10 min., and flexural moduluses of 16,900, 17,600, and 14,200 kg/cm$^2$.

The amorphous ethylene-butene copolymers (I)-1 and (I)-2 used as the component (B) (I) of the elastomer had butene contents of 13 and 20% by weight and Mooney viscosities, ML$_{1+4}$ (100° C.) of 13 and 15. The amorphous ethylene-propylene copolymers (II)-1, (II)-2, and (II)-3 used as the component (II) had ethylene contents of 75, 85, and 77 % by weight and Mooney viscosities ML$_{1+4}$ (100° C.), of 10, 16, and 63. As the component (III), the hydrogenated rubber (III)-1 had a styrene based block component content of 13% by weight and a MI of 9 g/10 min. (produced by Shell Chemical K.K. and marketed under trademark designation of "Clayton G1657X"), the hydrogenated rubber (III)-2 had a styrene-based block component content of 30% by weight and a MI of 13 g/10 min. (produced by Kuraray Co., Ltd. and marketed under trademark designation of "Septon 2002"), and the hydrogenated rubber (III)-3 had a styrene-based block component content of 29% by weight and a MI of 0 g/10 min. (produced by Shell Chemical K.K. and marketed under trademark designation of "Clayton G1657").

The talcs C-1, C-2, and C-3 used as the component (C) contained particles exceeding 10 μm in diameter in proportions of 0, 0, and 9.9% by weight, average particle diameters D$_{50}$ of 1.00, 3.36, and 2.17 μm, and combustion losses of 5.35, 5.23, and 8.20% by weight.

Examples 1 to 5 and Comparative Examples 1 to 7

A varying mixed composition having the abovementioned components combined in a ratio indicated in Table 1 was mixed in a tumbler with 0.1 PHR (parts by weight, based on 100 parts by weight of the produced mixed composition) of 2,6-ditertiary butyl-4-methyl phenol as an antioxidant, 0.3 PHR of pentaerystiryl- tetrakis [3-(3,5-ditertiary butyl-4-hydroxyphenyl)-propionate], 0.3 PHR of bis(2,2,6,6-tetramethyl-4-piperidyl) sebacate as an ultraviolet absorbent, 0.2 PHR of lithium stearate as a lubricant, and 1.0 PHR or carbon black as a pigment. The resultant mixture was melted and mixed in a high speed double-axis extruder at 220° C., pelletized by means of the extruder, and molded by an injection molding device, to produce test pieces.

The test pieces were tested for various physical properties by the methods described above. The results are shown in Table 1.

TABLE 1

| Composition | Unit | Example | | | | | Comparative Example | | | | | | |
|---|---|---|---|---|---|---|---|---|---|---|---|---|---|
| | | 1 | 2 | 3 | 4 | 5 | 1 | 2 | 3 | 4 | 5 | 6 | 7 |
| Composition Component (A) | | | | | | | | | | | | | |
| A-1 | wt % | 63 | — | 69 | — | 65 | — | 63 | 69 | 65 | 63 | 63 | 63 |
| A-2 | " | — | 60 | — | 62 | — | — | — | — | — | — | — | — |
| A-3 | " | — | — | — | — | — | 63 | — | — | — | — | — | — |
| Component (B) | | | | | | | | | | | | | |
| (I)-1 | " | 27 | — | 15 | 12 | — | 27 | 12 | 15 | 15 | 27 | — | 19 |
| (I)-2 | " | — | 28 | — | — | 15 | — | — | — | — | — | 27 | — |
| (II)-1 | " | — | — | 8 | — | — | — | 15 | — | — | — | — | — |
| (II)-2 | " | — | — | — | 3 | — | — | — | — | — | — | — | — |
| (II)-3 | " | — | — | — | — | — | — | — | 8 | — | — | — | — |
| (III)-1 | " | — | — | — | 8 | — | — | — | — | — | — | — | — |
| (III)-2 | " | — | — | — | — | 8 | — | — | — | — | — | — | — |
| (III)-3 | " | — | — | — | — | — | — | — | — | 8 | — | — | — |
| Component (C) | | | | | | | | | | | | | |

TABLE 1-continued

| Composition | Unit | Example 1 | Example 2 | Example 3 | Example 4 | Example 5 | Comparative Example 1 | Comparative Example 2 | Comparative Example 3 | Comparative Example 4 | Comparative Example 5 | Comparative Example 6 | Comparative Example 7 |
|---|---|---|---|---|---|---|---|---|---|---|---|---|---|
| C-1 | " | 10 | 12 | 8 | 15 | 12 | 10 | 10 | 8 | 12 | — | — | 10 |
| C-2 | " | — | — | — | — | — | — | — | — | — | 10 | — | — |
| C-3 | " | — | — | — | — | — | — | — | — | — | — | 10 | — |
| Physical properties | | | | | | | | | | | | | |
| MI | g/10 min. | 17.0 | 18.9 | 18.0 | 18.5 | 17.6 | 17.2 | 17.5 | 14.8 | 14.5 | 17.3 | 17.2 | 22.3 |
| Flexural modulus | kg/cm$^2$ | 13,900 | 14,300 | 13,600 | 16,000 | 15,400 | 12,100 | 12,500 | 12,900 | 14,800 | 13,900 | 13,800 | 18,800 |
| Izod impact strength | kg · cm/cm | 6.8 | 6.5 | 7.0 | 7.2 | 7.1 | 7.2 | 6.9 | 5.2 | 5.5 | 5.1 | 4.9 | 3.5 |
| Surface hardness | R-scale | 62 | 58 | 59 | 62 | 59 | 52 | 53 | 54 | 50 | 60 | 60 | 73 |
| Coating property | — | ○ | ○ | ○ | ○ | ○ | ○ | ○ | ○ | ○ | ○ | ○ | x |

It is clear from the above Examples and the Comparative Examples that the resin compositions according to the present invention invariably possessed ideal qualities, exhibited high fluidity as evinced by high MI values and high surface hardness, showed balanced magnitudes of rigidity and impact resistance, excelled in mechanical properties and in coating property and proved to be suitable for a large automobile bumper. The resin compositions of the Comparative Examples were deficient in either mechanical properties or coating property.

The present resin composition is produced by combining an ethylene-propylene block copolymer, and an elastomer, and talc of specific quality. It excels in flowability and can be easily injection molded to form large automobile bumpers. The shaped article of the present resin composition manifests a high surface hardness. Thus, the present resin composition is highly useful for the production of automobile bumpers.

We claim:

1. A resin composition for an automobile bumper comprising components (A), (B) and (C) described below:

(A) 45 to 74% by weight of a crystalline ethylene-propylene block copolymer having
  (a) a flexural modulus of 15,000 kg/cm$^2$ or more,
  (b) an ethylene content of 5 to 20% by weight,
  (c) an intrinsic viscosity (decalin, 135° C.) of a portion soluble in p-xylene at room temperature of 3 or more,
  (d) a melt flow index (MI) of 21 to 70 g/10 min., and
  (e) a content of a portion insoluble in boiling n-heptane of 97% by weight or more;

(B) 21 to 35% by weight of elastomer consisting essentially of:
  (i) component (I);
  (ii) components (I) and (II), having a weight ratio of (I) to {(I)+(II)} of from 0.5 to 1.0;
  (iii) components (I) and (III), having a weight ratio of (I) to {(I)+(III)} of from 0.5 to 1.0; or
  (iv) components (I), (II) and (III), having a weight ratio of (I) to {(I)+(II)+(III)} of from 0.5 to 1.0,
  (a) said component (I) being an amorphous ethylene-butene copolymer having a butene content of 10 to 25% by weight and a Mooney viscosity value (ML$_{1+4}$, 100° C.) of 5 to 20,
  (b) said component (II) being an amorphous ethylene-propylene copolymer having an ethylene content of 70 to 90% by weight and a Mooney viscosity value (ML$_{1+4}$, 100° C.) of 5 to 40, and
  (c) said component (III) being a hydrogenated block copolymer consisting of 10 to 40% by weight of an aromatic vinyl polymer block X and 60 to 90% by weight of a conjugate diene polymer block Y, having a structure of said block components being X–Y or X–(X–Y)$_n$, wherein n is 1 or 2, 90 mol% or more of said block Y being hydrogenated and the melt flow index (MI) of the hydrogenated block copolymer being 5 g/10 min. (230° C., 2.16 kg) or more, and;

(C) 5 to 20% by weight of talc having a combustion loss of 7% by weight or less, containing no particles having a diameter of 20 μm or more and having an average particle diameter D$_{50}$ of 1.0 to 3.0 μm; wherein said resin composition has a melt flow index (MI) of 15 g/10 min. (230° C.; 2.16 kg) or more and a surface hardness of 55 (Rockwell, R scale) or more.

2. A resin composition as claimed in claim 1, wherein the component (A) is composed of a crystalline ethylene-propylene block copolymer having (a) an ethylene content of 6 to 15% by weight, (b) a flexural modulus of 17,000 kg/cm$^2$ or more, (c) an intrinsic viscosity (decalin, 135° C.) of a portion soluble in p-xylene at room temperature of 4 or more, (d) a melt flow index of 25 to 50 and (e) a content of a portion insoluble in boiling n-heptane of 97.5% by weight or more.

3. A resin composition as claimed in claim 1, wherein the component (B) (I) is composed of an amorphous ethylene-butene copolymer having a butene content of 12 to 22% by weight and a Mooney viscosity ML$_{1+4}$ (100° C.) of 10 to 15.

4. A resin composition as claimed in claim 1, wherein the component (B) (II) is composed of an amorphous ethylene-propylene copolymer having an ethylene content of 75 to 85% by weight and a Mooney viscosity ML$_{1+4}$ (100° C.) of 10 to 30.

5. A resin composition as claimed in claim 1, wherein the component (B) (III) is composed of a hydrogenated rubber derived from the hydrogenation of the block polymer composed of 10 to 30% by weight of the aromatic vinyl compound polymer block component X and 90 to 70% by weight of the conjugated diene polymer block component Y.

6. A resin composition as claimed in claim 1, wherein the component (C) is composed of talc having a combustion loss of 5.5% by weight or less and a particle diameter of 1.0 to 2.5 μm.

7. An automobile bumper obtained from a resin composition according to claim 1.

* * * * *